United States Patent
Xu et al.

(10) Patent No.: US 8,486,313 B2
(45) Date of Patent: Jul. 16, 2013

(54) FLAME RETARDING THERMOPLASTIC ALLOY AND ITS PREPARATION METHOD

(75) Inventors: Jingwei Xu, Guangzhou (CN); Xiaoguang Ye, Guangzhou (CN); Bo Wu, Guangzhou (CN); Xiaohui Wu, Guangzhou (CN); Fanglin Ning, Guangzhou (CN); Fuyu Hu, Guangzhou (CN)

(73) Assignees: Kingfa Science & Technology Co., Ltd, Guangzhou, Guangdong (CN); Shanghai Kingfa Science & Technology Co., Ltd, Shanghai (CN)

( * ) Notice: Subject to any disclaimer, the term of this patent is extended or adjusted under 35 U.S.C. 154(b) by 0 days.

(21) Appl. No.: 13/001,564

(22) PCT Filed: Oct. 17, 2008

(86) PCT No.: PCT/CN2008/072734
§ 371 (c)(1),
(2), (4) Date: Dec. 27, 2010

(87) PCT Pub. No.: WO2010/043085
PCT Pub. Date: Apr. 22, 2010

(65) Prior Publication Data
US 2011/0095246 A1    Apr. 28, 2011

(51) Int. Cl.
*C08F 20/44* (2006.01)
*C09K 21/00* (2006.01)
*C09K 21/08* (2006.01)
*C09K 21/02* (2006.01)
*C09K 21/14* (2006.01)

(52) U.S. Cl.
USPC .............................. 252/609; 526/341; 252/601

(58) Field of Classification Search
USPC ........................................ 252/609
See application file for complete search history.

(56) References Cited

U.S. PATENT DOCUMENTS

| 5,082,897 A | 1/1992 | Udipi |
| 5,162,416 A | * 11/1992 | Udipi .......................... 524/399 |

FOREIGN PATENT DOCUMENTS

| CN | 1136053 A | 11/1996 |
| CN | 1396207 A | 2/2003 |
| CN | 101205309 A | 6/2008 |
| CN | 101215409 A | 7/2008 |
| EP | 0732364 A1 * | 9/1996 |
| JP | 61-207456 * | 9/1986 |
| JP | 402245052 * | 9/1990 |

OTHER PUBLICATIONS

Derwent English abstract of Miyata, JP 61-207456, Sep. 1996.*
English abstract of Kamishina et al., JP 402245052, Sep. 1990.*

* cited by examiner

*Primary Examiner* — Peter F Godenschwager
(74) *Attorney, Agent, or Firm* — Sughrue Mion, PLLC

(57) ABSTRACT

The present invention discloses a thermoplastic flame-retardant alloy and a method for preparing it, composed of the following components as below (parts by weight): 5-94 parts of ABS resin, 3-94 parts of polyester or co-polyester or the mixture of both, 1-50 parts of brominated flame retardant, 1-10 parts of flame-retardant aid, 0.001-30 parts of chlorinated polyethylene (CPE), 0.001-2 parts of anti-dripping agent and 0.1-6 parts of processing aid. Comparing with the ABS flame retardant presenting the prior art, the thermoplastic flame-retardant alloy features better glossiness, scratch resistance, stronger ultraviolet radiation resistance and better mechanical property, thus making up for the disadvantage that the flame-retardant ABS is prone to become yellow on some occasions with high weatherability requirements. Furthermore, the preparation method of the thermoplastic flame-retardant alloy for the present invention is successive, stable and feasible.

9 Claims, No Drawings

FLAME RETARDING THERMOPLASTIC ALLOY AND ITS PREPARATION METHOD

CROSS REFERENCE TO RELATED APPLICATIONS

This application is a National Stage of International Application No. PCT/CN2008/072734 filed Oct. 17, 2008, the content of which is incorporated herein by reference in its entirety.

BACKGROUND OF THE INVENTION

1. Technical Field

The present invention relates to a flame-retardant ABS resin technique, and more especially, to a thermoplastic flame-retardant alloy and a method for preparing it.

2. Description of Related Art

Flame-retardant ABS resin is widely applied in the shells of the household audio-visual equipment and the office electronic equipment, and other fields such as white household appliances and power changeover devices due to its good mechanical property, processing property and post-processing property, low molding shrinkage and superior size stability. A common flame-retardant ABS formula contains ABS resin, brominated flame retardant, stibium oxide or salt, anti-dripping agent, lubricant and other necessary processing aids in order to make the product with a balance of rigidity, toughness, fluidity and flame resistance. However, the double bond in the rubber of the ABS resin and the nitrile group of the acrylonitrile are easy to cause ring reaction under the ultraviolet, which leads to yellowing of the material, thus having limits on some weather-resistant occasion or the using of outdoor part because of the bad weatherability. Besides, the glossiness and the surface hardness are worse than PC/ABS or PC. Therefore, the appearance effect and scratch resistance are inferior to the abovementioned two materials.

In order to improve the ultraviolet resistance and the impact resistance of the ABS resin, Monsanto Inc., an American company, once prepared the mix alloy (U.S. Pat. No. 5,162,416) regarding SMA as the compatibilizer and the sodium stearate as the nucleating agent. The U.S. Pat. No. 5,082,897 also discloses that ABS, PC, PCTG binary/ternary alloy has a better mechanical property and weatherability than the three resins. Meanwhile, an obvious effect can be realized by applying PCTG on the surface of the ABS resin as the weatherability coating (E.P. Pat. No. 7,273,650 B2).

The study above aims at preparing the alloy by means of the ABS resin and the polyester/co-polyester without considering the requirements for application as the modified material such as processing property and physical property. In addition, the flame resistance of the material is firstly required in order to meet the safety requirements in appliances area. However, so far there is no disclosure about the flame-retardant ABS/polyester/co-polyester alloy.

According to our research, with the introduction of the PET or the co-polyester or the mixture of PET and the co-polyester in the flame-retardant ABS system (including ABS resin, flame retardant, flame-retardant aid, anti-dripping agent and other necessary processing aids), the pencil hardness of the part surface is heightened from the original 2B to HB, the glossiness is up about 10%, the notched impact strength is increased by about 20%, and the bending and drawing strength are improved to a certain extent. After being exposed under the ultraviolet, the chromatic difference of the color plate prepared is about 30% lower than the plate without polyester/co-polyester after 100 hours, that is, the surface hardness, glossiness, mechanical property and weatherability of the material are greatly improved.

BRIEF SUMMARY OF THE INVENTION

The present invention aims at overcoming the shortcomings of the existing flame-retardant ABS and providing a thermoplastic flame-retardant alloy featuring good glossiness, surface hardness, weatherability and mechanical property.

Another purpose of the present invention is to provide a method for preparing the thermoplastic flame-retardant alloy featuring simple procedure, successive production, high efficiency and stable product quality.

To achieve the abovementioned purposes, the present invention adopts the following technique solution: A thermoplastic flame-retardant alloy composed of the following components as below (parts by weight):

ABS resin, 5-94
co-polyester or the mixture of co-polyester and polyester, 3-94
Brominated flame retardant, 1-50
Flame-retardant aid, 1-10
Chlorinated polyethylene (CPE), 0.001-30
Anti-dripping agent, 0.001-2
Processing aid, 0.1-6
Preferred shall be:
ABS resin, 90
co-polyester or the mixture of co-polyester and polyester, 5-50
Brominated flame retardant, 2-30
Flame-retardant aid, 1-10
Chlorinated polyethylene (CPE), 1-15
Anti-dripping agent, 0.1-1
Processing aid, 0.1-0.4

In the abovementioned thermoplastic flame-retardant alloy, the ABS resin is composed of 5-80% weight of graft polybutadiene rubber and 95-20% weight of graft polystyrene-acrylonitrile copolymer. The ABS resin can be synthesized by means of emulsion graft or bulk polymerization, or by means of the direct mixing of the graft polybutadiene rubber and graft polystyrene-acrylonitrile copolymer.

In the abovementioned thermoplastic flame-retardant alloy, the polyester preferably is polyethylene terephthalate (PET), and the co-polyester is preferably selected from the PCTG, PETG or PCTA.

The structural formula of the polyethylene terephthalate is as shown in (I):

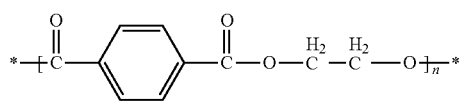

(I)

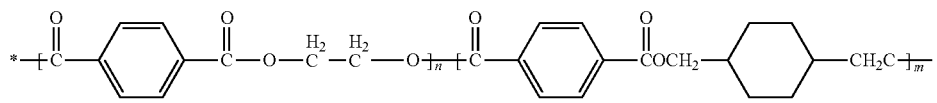

The structural formula (II) displays the structure of PCTG and PETG, wherein it is PCTG with the introduction of the cyclohexane-dimethylene-ethanol over 50%, and it is PETG, if less than 50%, it is PETG; wherein, m>1;

The structural formula of PCTA is as shown in (III):

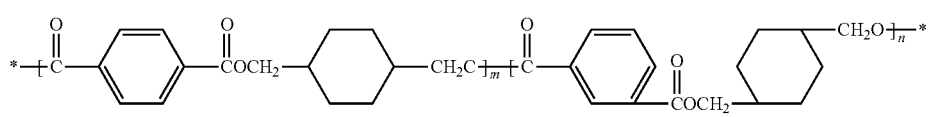

Wherein, m, n>1

In the abovementioned thermoplastic flame-retardant alloy, the brominated flame retardant is preferably selected from one of tetrabromobisphemol A (TBBPA), brominated epoxy (BEO), ribrom-triben-triazine (TBM) and brominated diphenylethane or the mixture of at least two of them.

In the abovementioned thermoplastic flame-retardant alloy, the flame-retardant aid preferably adopts diantimony trioxide.

In the abovementioned thermoplastic flame-retardant alloy, the anti-dripping agent is preferably selected from perfluoro-polyolefin or the perfluoro-polyolefin coated by the polystyrene-acrylonitrile.

In the abovementioned thermoplastic flame-retardant alloy, the processing aid is preferably selected from anti-ultraviolet & thermal oxidant or lubricant or their mixture. The anti-ultraviolet & thermal oxidant is preferably selected from one of hindered monophenol, alkylated hindered-polyphenol, phosphorous ester, amines, alkali metal or alkaline earth metal silicate and Hydroxybenzotriazole, or the mixture of at least two of them. The lubricant is preferably selected from one of the aliphatic amide, adipic acid or its salt, silicone oil, white mineral oil and poly-silicone, or the mixture of at least two of them.

The abovementioned preparation method of the present invention includes the procedure as follows: firstly premix the components in the high-speed mixer, add them to the twin-screw extruder, plasticize and mix them and then extrude them at the temperature of 150-250° C. so as to get the resultant flame-retardant alloy after cooling and granulation.

The favorable effects of the present invention are as follows: comparing with ABS flame retardant in the prior art, the thermoplastic flame-retardant alloy features better glossiness, scratch resistance, stronger ultraviolet radiation resistance and better mechanical property, thus making up for the disadvantage that the flame-retardant ABS is prone to become yellow on some occasions with high weatherability requirements. Furthermore, the preparation method of the thermoplastic flame-retardant alloy for the present invention is successive, stable and feasible.

DETAILED DESCRIPTION OF THE INVENTION

Embodiment 1

Accurately weigh 100 kg of ABS resin, 40 kg of PET, 20 kg of tetrabromobisphemol A, 10 kg of CPE, 9 kg of diantimony trioxide powder, 1 kg of Pentaerythrite tetra[β-(3',5'-di-tert-butyl-4'-hydroxyphenyl)-propionate] (anti-ultraviolet & thermal oxidant), 0.8 kg of ethylene bis-stearamide, 0.5 kg of anti-dripping agent perfluoro-polyethylene, and then fully mix them in the high-speed mixer and then get the resultant thermoplastic flame-retardant alloy of the present invention by means of one-step melt blending & extrusion in one-pot. The physical properties of the present invention prepared are as below (ISO standard): the IZOD notched impact strength is 25 KJ/m$^2$, the bending strength is 66 MPa, the glossiness (at an incident angle of 60°) is 94.5 and the flame-retardant level (UL94) is 1.5 mm V-0.

Embodiment 2

Accurately weigh 100 kg of ABS resin, 30 kg of PET, 15 KG of PETG, 15 kg of tetrabromobisphemol A, 15 kg of CPE, 5 kg of diantimony trioxide powder, 1 kg of Pentaerythrite tetra[β-(3',5'-di-tert-butyl-4'-hydroxyphenyl)-propionate] (anti-ultraviolet & thermal oxidant), 0.3 kg of ethylene bis-stearamide, 0.8 kg perfluoro-polyethylene, and then fully mix them in the high-speed mixer and then get the resultant thermoplastic flame-retardant alloy of the present invention by means of one-step melt blending & extrusion in one-pot. The physical properties of the present invention prepared are as below (ISO standard): the IZOD notched impact strength is 28 KJ/m$^2$, the bending strength is 64 MPa, the glossiness (at an incident angle of 60°) is 92 and the flame-retardant level (UL94) is 1.5 mm-V-0.

Embodiment 3

Accurately weigh 100 kg of ABS resin, 25 kg of PETG, 25 kg of PCTG, 10 kg of tetrabromobisphemol A, 5 Kg of brominated epoxy, 8 kg of CPE, 3 kg of diantimony trioxide powder, 0.5 kg of Pentaerythrite tetra[β-(3',5'-di-tert-butyl-4'-hydroxyphenyl)-propionate] (anti-ultraviolet & thermal oxidant), 2 kg of ethylene bis-stearamide, 0.5 kg of perfluoro-polyethylene, and then fully mix them in the high-speed mixer and then get the resultant thermoplastic flame-retardant alloy of the present invention by means of one-step melt blending & extrusion in one-pot. The physical properties of the present invention prepared are as below (ISO standard): the IZOD notched impact strength is 30 KJ/m$^2$, the bending strength is 63 MPa, the glossiness (at an incident angle of 60°) is 89 and the flame-retardant level (UL94) is 1.5 mm-V-0.

Embodiment 4

Accurately weigh 100 kg of ABS resin, 10 kg of PET, 30 KG of PCTA, 15 Kg of tribrom-triben-triazine, 5 kg of diantimony trioxide powder, 0.2 kg of Pentaerythrite tetra[β-(3', 5'-di-tert-butyl-4'-hydroxyphenyl)-propionate] (anti-ultraviolet & thermal oxidant), 1 kg of ethylene bis-stearamide, 0.3 kg of perfluoro-polyethylene, and then fully mix them in the high-speed mixer and then get the resultant thermoplastic flame-retardant alloy of the present invention by means of one-step melt blending & extrusion in one-pot. The physical properties of the present invention prepared are as below (ISO standard): the IZOD notched impact strength is 33 KJ/m$^2$, the bending strength is 65 MPa, the glossiness (at an incident angle of 60°) is 96 and the flame-retardant level (UL94) is 1.5 mm-V-0.

What is claimed is:

1. A thermoplastic flame-retardant alloy consisting of (parts by weight):
    ABS resin, 5-94,
    a mixture of PET and co-polyester, 3-94,
    a brominated flame retardant, 1-50,
    a flame-retardant aid, 1-10,
    a chlorinated polyethylene (CPE), 0.001-30,
    an anti-dripping agent, 0.001-2, and
    a processing aid, 0.1-6, wherein the processing aid is selected from anti-ultraviolet and thermal oxidant, lubricant, and a mixture thereof.

2. The thermoplastic flame-retardant alloy as claimed in claim 1, consisting of (parts by weight):
    ABS resin, 90,
    a mixture of PET and co-polyester, 5-50,
    a brominated flame retardant, 2-30,
    a flame-retardant aid, 1-10,
    a chlorinated polyethylene (CPE), 1-15,
    an anti-dripping agent, 0.1-1, and
    a processing aid, 0.1-0.4.

3. The thermoplastic flame-retardant alloy as claimed in claim 1, wherein the ABS resin is composed of 5-80% weight of graft polybutadiene rubber and 95-20% weight of graft polystyrene-acrylonitrile copolymer.

4. The thermoplastic flame-retardant alloy as claimed in claim 1, wherein the co-polyester is selected from PCTG, PETG, and PCTA.

5. The thermoplastic flame-retardant alloy as claimed in claim 1, wherein the brominated flame retardant is selected from one of tetrabromobisphenol A (TBBPA), brominated epoxy, tribrom-triben-triazine (TBM) and brominated diphenylethane, and a mixture of at least two of them.

6. The thermoplastic flame-retardant alloy as claimed in claim 1, wherein the flame-retardant aid is diantimony trioxide.

7. The thermoplastic flame-retardant alloy as claimed in claim 1, wherein the anti-dripping agent is selected from perfluoro-polyolefin and perfluoro-polyolefin coated by the polystyrene-acrylonitrile.

8. The thermoplastic flame-retardant alloy as claimed in claim 1, wherein the anti-ultraviolet & thermal oxidant is selected from one of hindered monophenol, alkylated hindered-polyphenol, phosphorous ester, amines, alkali metal or alkaline earth metal silicate and hydroxybenzotriazole, and a mixture of at least two of them; the lubricant is selected from one of the aliphatic amide, adipic acid or its salt, silicone oil, white mineral oil and poly-silicone, and a mixture of at least two of them.

9. A method for preparing the thermoplastic flame-retardant alloy as claimed in claim 1, wherein the method includes the procedure as follows: firstly premixing the components in the high-speed mixer, adding them to the twin-screw extruder, plasticizing and mixing them and then extruding them at the temperature of 150-250° C. so as to get the resultant flame-retardant alloy after cooling and granulation.

* * * * *